May 3, 1938.  H. R. TEAR  2,116,004

LUBICATING DEVICE

Filed Oct. 25, 1935

INVENTOR
HARRY R. TEAR.
BY
ATTORNEY

Patented May 3, 1938

2,116,004

UNITED STATES PATENT OFFICE 2,116,004

LUBRICATING DEVICE

Harry R. Tear, Evanston, Ill., assignor to The Lubrication Corporation, Chicago, Ill., a corporation of Delaware Application October 25, 1935, Serial No. 46,640

11 Claims. (Cl. 221—47.4)

This invention relates to lubricating devices and more particularly to lubricant discharge nozzles or couplers which can be adjusted angularly.

In a machine such as an automobile, lubricant-receiving fittings are frequently so located that access thereto is more or less blocked by parts of the machine making it difficult, if not impossible, to reach such fittings with a straight nozzle or coupler. It has been proposed to utilize angle adapters or flexible hoses or free swivels to enable servicing or such relatively inaccessible fittings but adapters are expensive since a different adapter is required for each different angle desired, hoses are also expensive and are not capable of being bent through a very sharp angle, and free swivels are extremely difficult to handle. It will further be apparent that neither a hose nor a free swivel can be used with a push-type gun in which the gun is operated by a thrust exerted toward a fitting since neither possesses the required rigidity for this type of operation.

Accordingly one of the objects of the present invention is to provide a lubricant discharge nozzle which is angularly adjustable to facilitate servicing of such relatively inaccessible fittings.

Another object of the invention is to provide an angularly adjustable nozzle including locking means to lock it selectively in one of a plurality of angular positions.

Still another object is to provide a lubricating device including a lubricant container, a push type pump and an angularly adjustable nozzle.

Other objects, the advantages, and novel features of the invention will be apparent from the following detailed description when read in connection with the accompanying drawing illustrating two embodiments of the invention in which.

Figure 1:
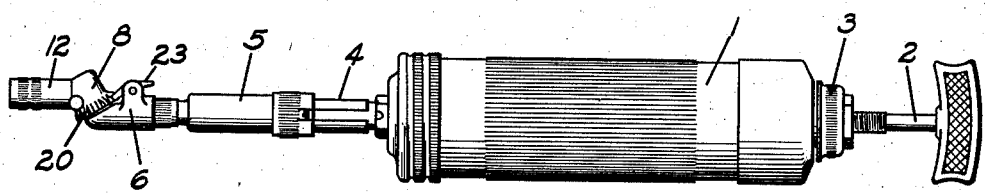
Fig. 1 is a side view of a lubricant-gun embodying the invention.
Figure 3:
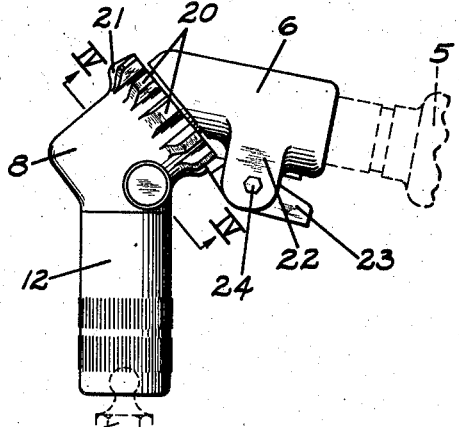
Fig. 3 is a partial side view showing the nozzle of Fig. 1 in a different position.

The lubricant gun shown in Fig. 1 is constituted by a cylindrical barrel or container 1 which may contain bulk lubricant but which preferably serves as a casing for an interchangeable lubricant cartridge such as is shown in my copending application Serial No. 753,663. Lubricant in the container 1 or in the cartridge therein is placed under pressure to be forced therefrom by a feed screw 2 which is threadedly connected to the container as by a quick release device 3 which is more particularly described and claimed in my above mentioned application and which can engage the feed screw or release it for free axial movement. A high pressure pump constituted by a part 4 connected to and communicating with the outlet of the container and a part 5 telescopically mounted on the part 4 is axially alined with the container and is connected to a discharge nozzle to be described later. Lubricant may be dispensed by operating the feed screw to force lubricant from the container into the pump, placing the discharge nozzle on a fitting and thrusting the container toward the nozzle to telescope the pump parts to force the lubricant from the pump under high pressure.

Figure 2:
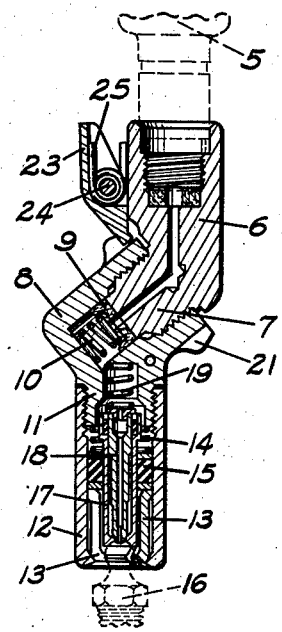
Fig. 2 is a central section through the nozzle of Fig. 1.
Figure 4:
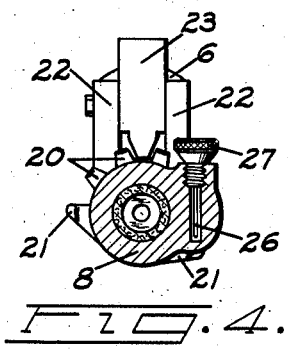
Fig. 4 is a section on the line IV—IV of Fig. 3, looking in the direction of the arrows.

The discharge nozzle as shown is constituted by a rigid conduit portion 6 having a threaded extension 7 projecting therefrom at an angle of approximately 50° and a nozzle member 8 threaded on the extension and rotatable thereon. Communicating passages are provided in the conduit and nozzle members and if desired a cup leather 9 held in place by a spring 10 may be provided to prevent leakage at the joint between these two members. The nozzle member 8 has an extension 11 arranged at approximately 50° to the extension 7 when the parts are assembled so that the conduit 6 and extension 11 are substantially aligned with their axes only slightly displaced as shown in Figs. 1 and 2. The extension 11 carries a suitable coupling for sealing engagement with a lubricant receiving fitting, shown as comprising a tubular casing 12 having internal cam surfaces at its forward end and containing clamp fingers 13 urged forwardly against the cam surfaces by a spring 14 and a lubricant pressure responsive piston 15 to clamp a fitting 16 therein. A tube 17 is slidably mounted in the piston 15 and terminates in a surface recessed to receive the fitting end to center the fitting. A discharge tube 18 is slidably mounted in the tube 17 and terminates in a pointed end adapted to enter and make sealing engagement with the inlet opening in the nipple 16, a spring 19 being provided to urge the discharge tube 18 against the fitting and lubricant pressure acting on the end of the discharge tube further urging it against the fitting. If desired the nozzle member may be bored as 26 to receive a cleaning member 27 for the discharge tube 18. While the particular coupling illustrated has been described in considerable detail it will be understood that any other suitable type of coupling or nozzle might be employed.

In order to prevent free swiveling movement and to lock the nozzle member selectively in any one of a plurality of angular positions, the nozzle member 8 is formed with a series of locking teeth 20 preferably extending throughout about half of its circumference and having enlarged end teeth 21. A pair of lugs 22 are formed on the conduit member 6 and a pawl 23 having one end shaped to fit between the teeth 20 is mounted on a pivot pin 24 extending through the lugs 22 and the pawl. Preferably a coil spring 25 is mounted on the pivot and engages the pawl to urge it into a position to engage the teeth 20.

In order to adjust the nozzle, the outer end of the pawl is depressed to move its inner end out of engagement with the teeth 20 and to permit free swiveling of the nozzle member 8 about the axis of the extension 7. When the nozzle is in the desired angular position the outer end of the pawl may be released, permitting the spring 25 to move the inner end of the pawl into engagement with the locking teeth 20 to lock the parts against further swiveling movement. The end teeth 21 are large enough so that they will not clear the pawl even when its inner end is raised, and thus act as stops to limit swiveling movement of the nozzle. If it is desired to remove the nozzle member 8 from the extension 7, the pawl must first be removed by removing the pivot pin 24 and the member 8 can then be unscrewed.

Figure 5:
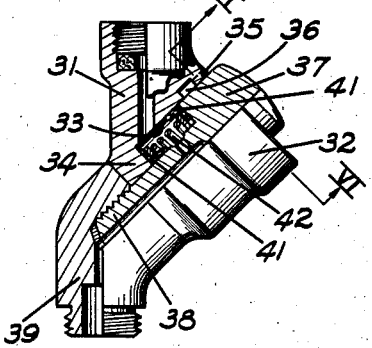
Fig. 5 is a central section with parts in elevation of another embodiment of the invention.
Figure 6:
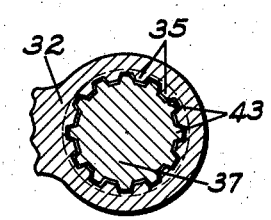
Fig. 6 is a section on the line VI—VI of Fig. 5, looking in the direction of the arrows.

Figs. 5 and 6 illustrate a modified form of nozzle comprising a rigid conduit 31 terminating in a head 32 having an enlarged cylindrical bore 33 whose axis is at an angle of approximately 50° to the axis of the conduit 31 and which is restricted at one end by an annular shoulder 34 to provide a reduced bore. A series of locking teeth 35 is formed in the head 32 at the open end of the bore 33 and an annular cavity 36 slightly larger in section than the teeth 35 is cut in the head just inside of the teeth. A plug having an enlarged head 37 to fit the bore 33 and a reduced stem 38 to fit the opening in shoulder 34 is mounted in the head and the stem 38 is connected to a nozzle member 39 which is formed at an angle of substantially 50° therewith. The nozzle member 39 may carry any suitable type of coupling for forming a lubricant tight seal with a fitting, such as the coupling shown in Figs. 1 to 4, and communicating passages are provided through the conduit, the plug and the nozzle member so that lubricant can flow from the conduit to the coupling secured to the nozzle member. Suitable packings 41 are preferably provided to seal the joints between the plug and head to prevent leakage therethrough and a spring 42 holds the packings in place and also urges the plug outwardly to the position shown in Fig. 5.

To lock the plug and nozzle member against free rotation in the bore 33, a series of locking teeth 43 is provided on the head 37 of the plug for engagement with the locking teeth 35. With the parts in the position of Fig. 5 the two sets of teeth 35 and 43 are in register and the nozzle member is locked against swiveling movement. When it is desired to adjust the nozzle, the head 37 may be depressed against the spring 42 to move the teeth 43 out of register with the teeth 35 and into register with the annular cavity 36, in which position the plug may rotate freely in the conduit head. When the plug and nozzle member have been rotated to the desired angular position the head 37 may be released permitting the spring 42 to move the plug outwardly and again to bring the teeth 35 and 43 into register, thus locking the plug and nozzle member against further angular movement.

It will be apparent that with the nozzle of the present invention in cases where obstructions prevent a straight approach to a fitting, the nozzle may be adjusted to any desired angular position and locked to permit approach to the fitting around the obstruction. The ability to lock the nozzle in the desired angular position is of particular utility for use with push type guns such as that shown in Fig. 1, since it not only facilitates handling of the nozzle in connecting it to a fitting, but enables a thrust to be applied without causing undesirable swiveling. The arrangement of the swivel axis at an angle of about 50°, preferably from 40° to 50°, to the nozzle and conduit provides a wide range of angular movement, an angle of 50° enabling the nozzle to be moved through any angle from parallelism to 100° to the conduit. With the swivel axis at an angle it will also be noted that the swivel parts rotate through substantially 180° to move the conduit through approximately 100°, thus enabling a fine adjustment to be obtained without requiring a large number of fine locking teeth. Thus the present invention greatly facilitates lubrication of a machine and enables an operator to reach readily and to service properly, fittings which would otherwise be extremely difficult if not impossible to reach without special attachments.

While two embodiments of the invention have been shown and described it will be apparent that changes might be made or that the invention might be embodied in other forms. It is, therefore, not intended that the scope of the invention shall be limited to the embodiments shown or otherwise than by the terms of the appended claims.

I claim:

1. A lubricant discharge nozzle comprising, a rigid conduit, a nozzle member formed for sealing engagement with a lubricant receiving fitting, means forming a swivel connection between said conduit and nozzle, the axis of said swivel connection being at an angle less than a right angle to said conduit whereby swiveling of the nozzle changes the angular relationship between the conduit and the nozzle, the conduit, the swivel connection and the nozzle being formed with passages whereby the conduit is in communication with the nozzle at all times, and means for selectively locking said nozzle in any one of a plurality of radial positions about said swivel connection.

2. A lubricant discharge nozzle comprising, a rigid conduit, a nozzle member formed for sealing engagement with a lubricant receiving fitting, means forming a swivel connection between said conduit and nozzle, the axis of said swivel connection being at an angle less than a right angle to said conduit whereby swiveling of the nozzle changes the angular relationship between the conduit and the nozzle, there being intercommunicating passages through the conduit, the swivel connection and the nozzle whereby the conduit is in communication with the nozzle at all times, a series of locking teeth carried by said nozzle member, and means carried by said conduit to engage said teeth thereby to lock said nozzle selectively in any one of a plurality of radial positions about said swivel connection.

3. A lubricant discharge nozzle comprising, a rigid conduit member, a nozzle member formed for sealing engagement with a lubricant receiving fitting, means forming a swivel connection between said members, the axis of said swivel connection being at an angle other than a right angle to said conduit, and means for selectively locking said members in any one of a plurality of positions to prevent swiveling thereof.

4. A lubricant discharge nozzle comprising, a rigid conduit member, a nozzle member formed for sealing engagement with a lubricant receiving fitting, means forming a swivel connection between said members, the axis of said swivel connection being at an angle other than a right angle to said conduit, a plurality of locking teeth carried by one of said members, and means carried by the other of said members and engageable with said teeth to lock said nozzle selectively in any one of a plurality of swiveled positions.

5. A lubricant discharge nozzle comprising, a rigid conduit member, a nozzle member formed for sealing engagement with a lubricant receiving fitting, means forming a swivel connection between said members, the axis of said swivel connection being at an angle other than a right angle to said conduit and said nozzle, the angle between the conduit and the swivel axis being equal to the angle between the nozzle and the swivel axis, and means for selectively locking said swivel connection in any one of a plurality of positions.

6. A lubricant discharge nozzle comprising, a rigid conduit member, a nozzle member formed for sealing engagement with a lubricant receiving fitting, means forming a swivel connection between said members, the axis of said swivel connection being at an angle other than a right angle to said conduit, a plurality of locking teeth carried by said nozzle member, and means carried by said conduit member and engageable with said teeth to lock said swivel connection selectively in one of a plurality of positions.

7. A lubricant discharge nozzle comprising, a rigid conduit member, a rigid nozzle member formed for sealing engagement with a lubricant receiving fitting, means forming a swivel connection between said members, the axis of said connection being at an angle to said members, a series of locking teeth carried by one of said members, and a pivoted pawl carried by the other member and engageable with said teeth for selectively locking said swivel connection in one of a plurality of positions.

8. A lubricant discharge nozzle comprising, a rigid conduit, an extension on said conduit at an angle thereto, a nozzle rotatably mounted on said extension, a plurality of locking teeth on said nozzle, and a pawl pivoted on said conduit and engageable with said teeth for selectively locking the nozzle in one of a plurality of angular positions about said extension.

9. A lubricant discharge nozzle comprising a rigid conduit member, a rigid nozzle member pivotally mounted on said conduit member for rotation about an axis at an angle thereto, said members being relatively slidable, and locking means operated by relative sliding of said members for selectively locking the nozzle member in one of a plurality of angular positions.

10. A lubricant discharge nozzle comprising a rigid conduit member, a rigid nozzle member pivotally mounted on said conduit member for rotation about an axis at an angle thereto, said nozzle and conduit members being relatively slidable along said axis, and locking teeth carried by said members and dis-engageable by relative sliding movement thereof for selectively locking said members in one of a plurality of relative angular positions.

11. A lubricating device comprising, an elongated cylindrical lubricant container, a pump including relatively telescoping parts axially alined with and connected to one end of the container, a nozzle connected to said pump, said pump being operable by forcing the container toward the nozzle, said nozzle including parts angularly adjustable about an axis at an acute angle to the nozzle axis, and means for selectively locking said nozzle parts in one of a plurality of angular positions.

HARRY R. TEAR.